United States Patent
Yow et al.

(10) Patent No.: US 8,640,328 B1
(45) Date of Patent: Feb. 4, 2014

(54) SYSTEMS FOR FASTENING A HEAD STACK TO A HARD DRIVE BASE ASSEMBLY

(75) Inventors: Chin Wai Yow, Kuala Lumpur (MY); Jit Han Tan, Petaling Jaya (MY)

(73) Assignee: Western Digital Technologies, Inc., Irvine, CA (US)

( * ) Notice: Subject to any disclaimer, the term of this patent is extended or adjusted under 35 U.S.C. 154(b) by 639 days.

(21) Appl. No.: 12/819,123

(22) Filed: Jun. 18, 2010

(51) Int. Cl.
  *G11B 5/48* (2006.01)
  *G11B 17/038* (2006.01)

(52) U.S. Cl.
  USPC ......... 29/737; 29/603.03; 29/757; 360/265.9; 360/244.5

(58) Field of Classification Search
  USPC .............. 29/737, 738, 757, 758, 759, 603.03, 29/525.11; 411/386; 360/265.7, 265.9, 360/244.5
  See application file for complete search history.

(56) References Cited

U.S. PATENT DOCUMENTS

| | | | |
|---|---|---|---|
| 2,122,915 A * | 7/1938 | Olson | 411/386 |
| 4,246,811 A | 1/1981 | Bondhus et al. | |
| 5,140,877 A | 8/1992 | Sloan | |
| 5,251,521 A | 10/1993 | Burda et al. | |
| 5,370,021 A | 12/1994 | Shigematsu | |
| 5,408,905 A | 4/1995 | Mikic et al. | |
| 6,032,556 A | 3/2000 | Hu | |
| 6,256,173 B1 * | 7/2001 | Chee et al. | 360/265.7 |
| 7,178,432 B1 | 2/2007 | Han et al. | |
| 7,458,282 B1 | 12/2008 | Wuester, Sr. et al. | |
| 7,506,553 B1 | 3/2009 | Panyavoravaj | |
| 8,307,537 B1 * | 11/2012 | Klassen et al. | 29/603.03 |

FOREIGN PATENT DOCUMENTS

JP   11096524 A  *  4/1999

* cited by examiner

*Primary Examiner* — A. Dexter Tugbang

(57) ABSTRACT

A system for fastening a head stack to a hard drive base assembly (HDBA) comprises a threaded head stack pivot (THSP) having a socket defined therein. The socket comprises a proximal portion defined by inner walls arranged parallel to a longitudinal axis of the socket and a distal portion having a width less than a width of the proximal portion and forming a ledge adjacent to the proximal portion. The system also comprises a bit for driving the THSP into an HDBA. The bit comprises a head comprising contact surfaces arranged parallel to a longitudinal axis of the bit and tapered surfaces extending from respective contact surfaces to a distal end of the bit. The bit is configured to engage the ledge at seams formed between adjacent tapered surfaces and to engage the inner walls with respective contact surfaces when driving the THSP into the HDBA.

27 Claims, 6 Drawing Sheets

SYSTEMS FOR FASTENING A HEAD STACK TO A HARD DRIVE BASE ASSEMBLY

FIELD

The present invention generally relates to manufacturing and assembly equipment and, in particular, relates to systems and methods for fastening a head stack to a hard drive base assembly.

BACKGROUND

A hard disc drive (HDD) has very small working gaps in which particulate contamination can affect reliability and possibly lead to complete failure of the HDD. For example, the slider and the suspension of a head stack assembly are positioned very close (e.g., tens of nanometers) to the surface of a spinning disc during read and write processes. Loose particles within the HDD may become entrapped between the slider or suspension and the surface of the disc, leading to permanent damage from abrasive wear as the disc is rotated. Thus, during the assembly process of an HDD, it is beneficial to minimize the amount of contaminant particles that the HDD is exposed to. In particular, it is desirable to provide HDD assembly tools that enhance the cleanliness level during the HDD assembly process.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

In the following detailed description, numerous specific details are set forth to provide a full understanding of the subject technology. It will be apparent, however, to one ordinarily skilled in the art that the subject technology may be practiced without some of these specific details. In other instances, well-known structures and techniques have not been shown in detail so as not to obscure the subject technology.

During the assembly process of an HDD, a head stack may be fastened onto a hard drive base assembly using a threaded head stack pivot. The threaded head stack pivot may be driven into a corresponding threaded hole of the hard drive base assembly to fasten the head stack to the hard drive base assembly. The threaded head stack pivot comprises a socket that a bit may engage to drive the threaded head stack pivot into the hard drive base assembly. However, contact between the bit and the socket may result in abrasion and the shedding of particles from the bit and/or the socket during the assembly process of the HDD. These particles may contaminate the HDD during its assembly and may result in reduced reliability and/or failure of the HDD. Thus, it is desirable to minimize the amount of particles that an HDD is exposed to during its assembly, particularly when a head stack is being fastened to a hard drive base assembly. According to various aspects of the subject technology, systems and methods are provided to minimize the contact between a bit and a socket of a threaded head stack pivot in order to minimize the amount of particles that may be generated as a result of the contact between the bit and the socket.

Figure 1:
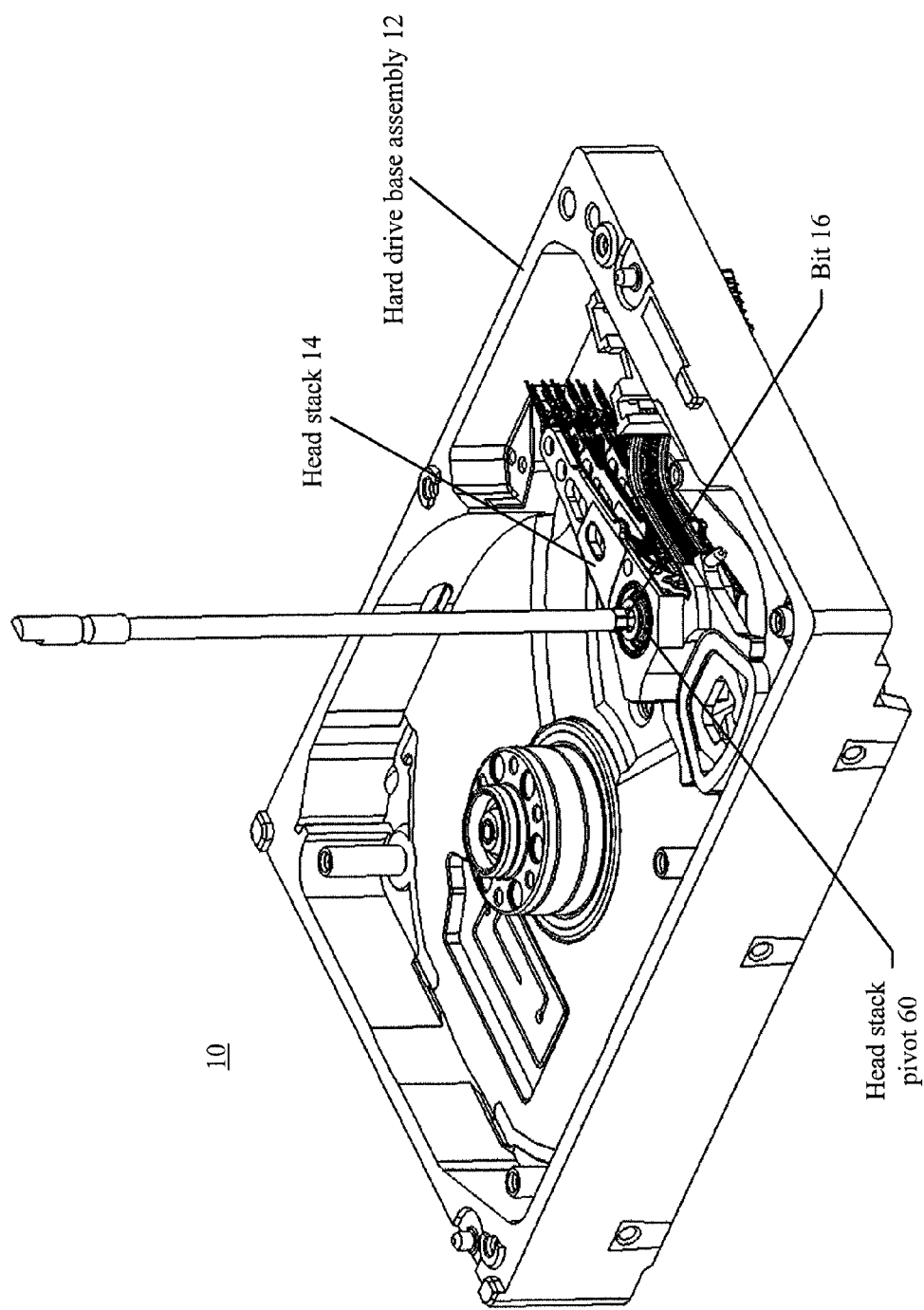
FIG. 1 illustrates a perspective view of a hard disc drive (HDD) in accordance with various aspects of the subject technology.
Figure 2:
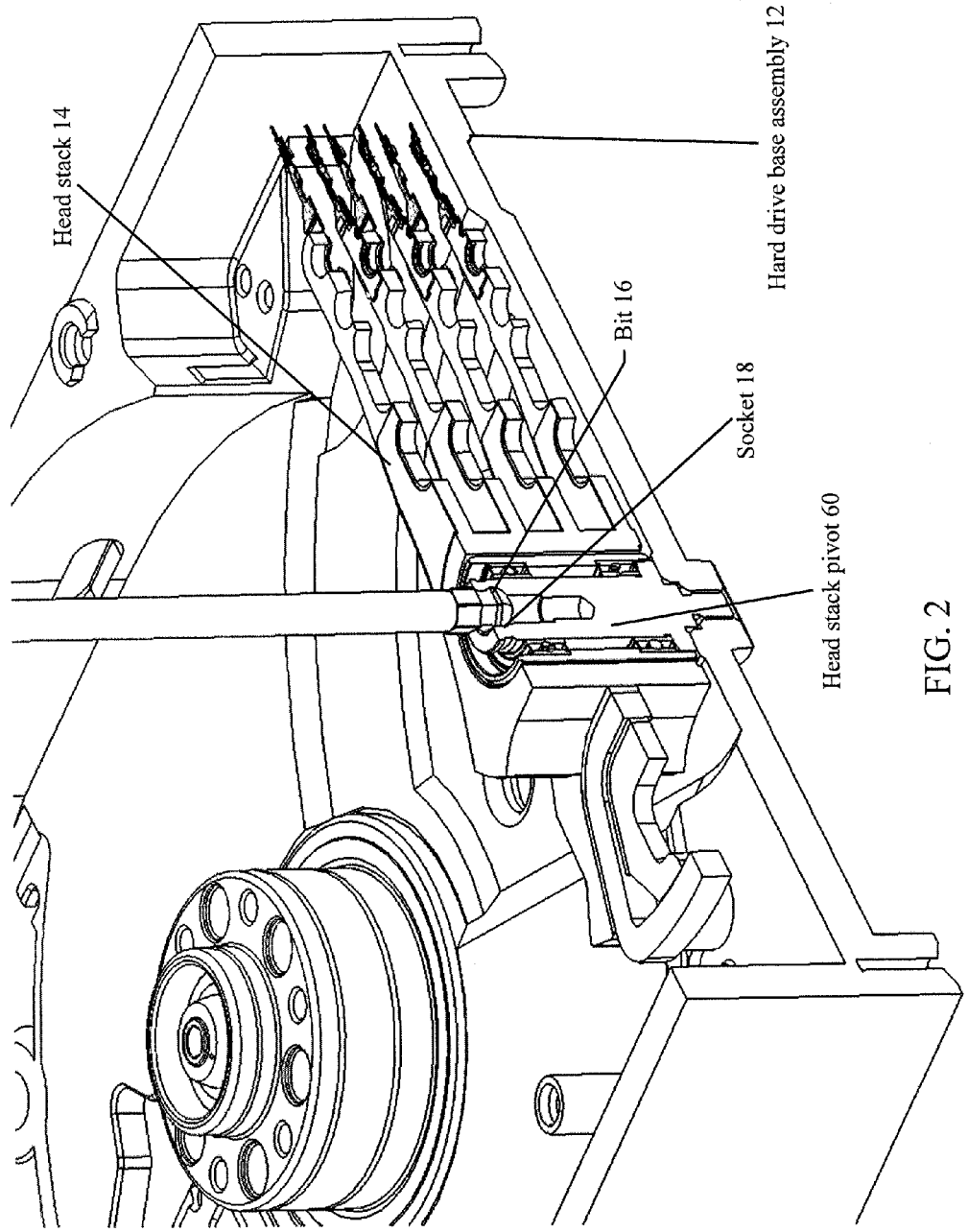
FIG. 2 illustrates a cross-sectional view of a head stack and a hard drive base assembly shown in FIG. 1, in accordance with various aspects of the subject technology.

FIG. 1 illustrates a perspective view of hard disc drive (HDD) 10 in accordance with various aspects of the subject technology. As shown in FIG. 1, bit 16 is used to drive head stack pivot 60 of head stack 14 into hard drive base assembly 12 to fasten head stack 14 to hard drive base assembly 12. FIG. 2 illustrates a cross-sectional view of head stack 14 and hard drive base assembly 12 shown in FIG. 1, in accordance with various aspects of the subject technology. As shown in greater detail in FIG. 2, bit 16 engages socket 18 defined in head stack pivot 60 to drive head stack pivot 60 into hard drive base assembly 12. Thus, head stack 14 may be securely fastened to hard drive base assembly 12 and pivot about head stack pivot 60 for extending its read/write heads over and under the one or more discs (not shown) of HDD 10. According to various aspects of the subject technology, contact between bit 16 and socket 18 may be minimized in order to minimize the amount of particles that may be generated as a result of the contact between bit 16 and socket 18.

Figure 3:
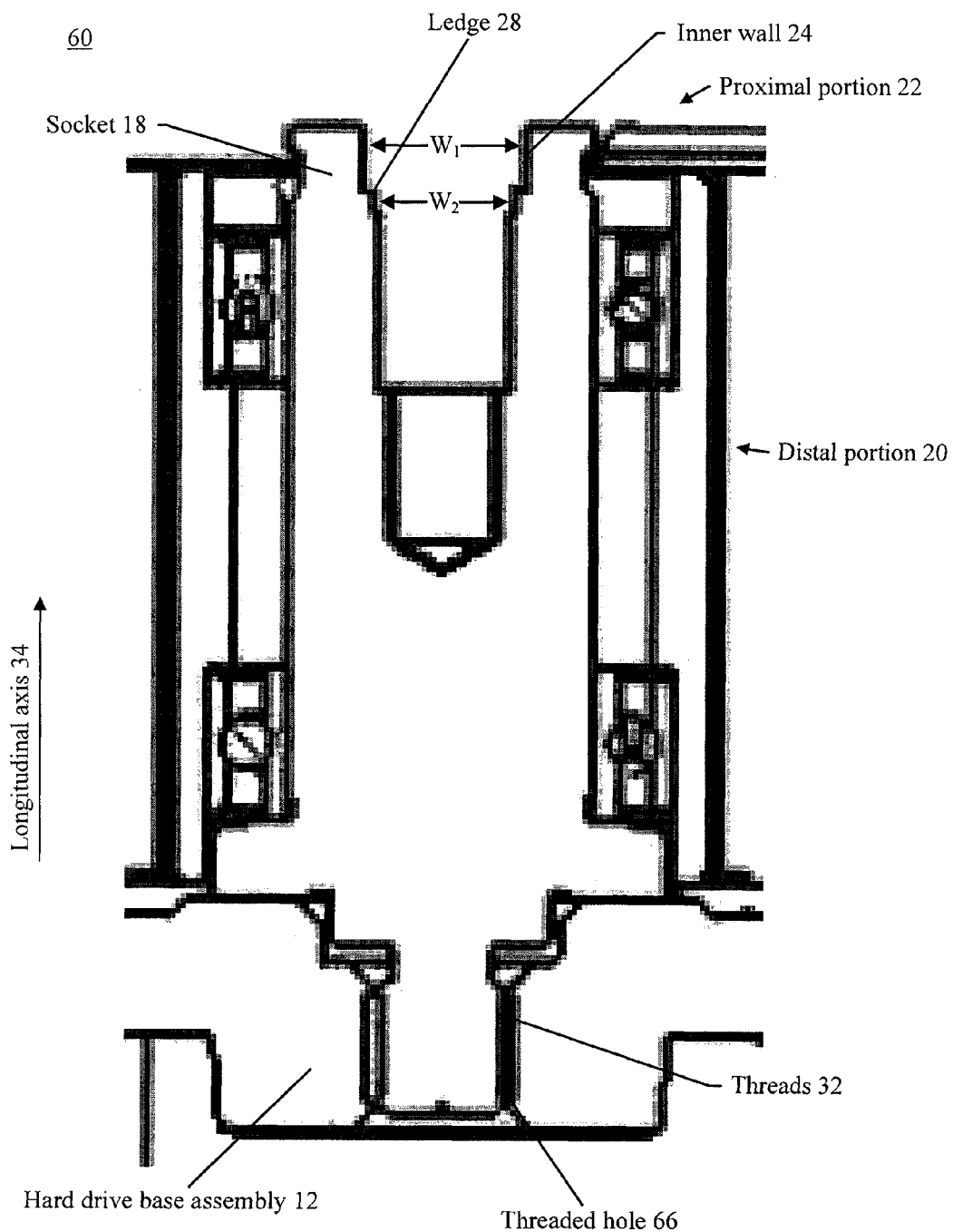
FIG. 3 illustrates a cross-sectional view of a head stack pivot in accordance with various aspects of the subject technology.

FIG. 3 illustrates a cross-sectional view of head stack pivot 60 in accordance with various aspects of the subject technology. Head stack pivot 60 comprises threads 32 for rotatably fastening head stack pivot 60 to a corresponding threaded hole 66 of hard drive base assembly 12. Socket 18 comprises proximal portion 22 having a width $W_1$ and defined by a plurality of inner walls 24 arranged parallel to longitudinal axis 34 of socket 18. Socket 18 also comprises distal portion 20 having a width $W_2$ that is less than width $W_1$ thereby forming ledge 28 adjacent to proximal portion 22. Bit 16 may engage the plurality of inner walls 24 to drive head stack pivot 60 into threaded hole 66 for fastening head stack 14 to hard drive base assembly 12.

Figure 4A:
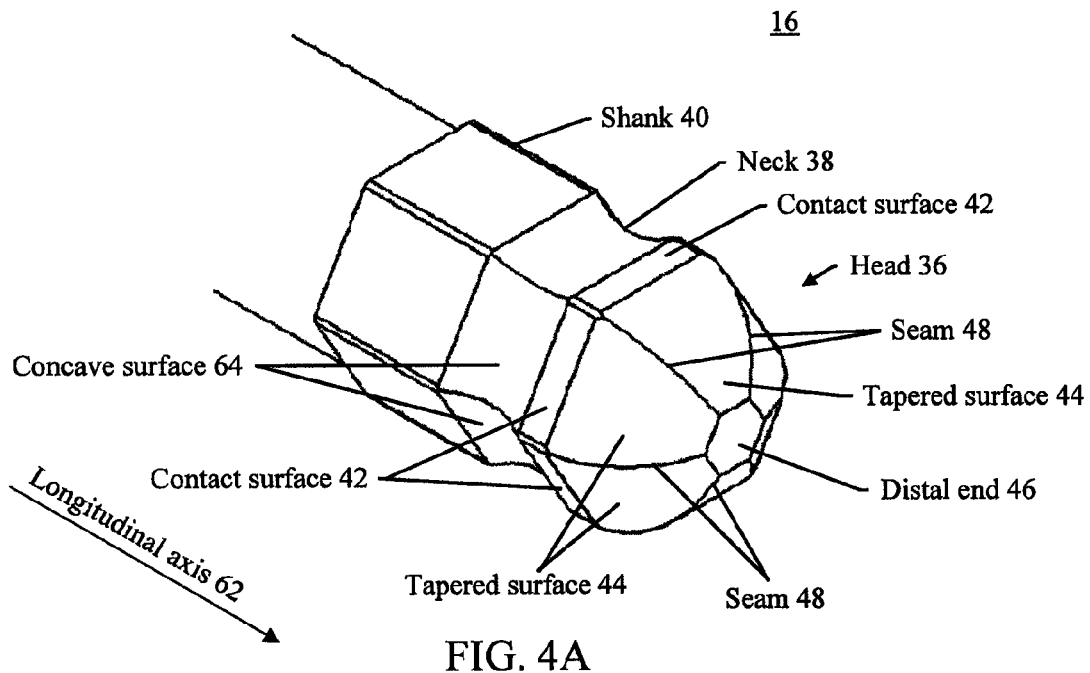
FIG. 4A illustrates a perspective view of a bit in accordance with various aspects of the subject technology.

FIG. 4A illustrates a perspective view of bit 16 in accordance with various aspects of the subject technology. Bit 16 comprises head 36 comprising a plurality of contact surfaces 42 arranged parallel to a longitudinal axis 62 of bit 16 and a plurality of tapered surfaces 44 extending from respective ones of the plurality of contact surfaces 42 to distal end 46. A plurality of seams 48 are formed between adjacent ones of the plurality of tapered surfaces 44. Bit 16 also comprises shank 40 and a grooved neck 38 formed in shank 40. Head 36 extends from the grooved neck 38 towards distal end 46.

According to various aspects of the subject technology, bit 16 is configured such that head 36 and a portion of the grooved neck 38 are positioned inside of socket 18 when driving the threaded head stack pivot 60 into hard drive base assembly 12. In some aspects, bit 16 is configured to engage ledge 28 at the plurality of seams 48 and to engage the plurality of inner walls 24 of socket 18 with respective ones of the plurality of contact surfaces 42 when driving the threaded head stack pivot 60 into hard drive base assembly 12. The plurality of seams 48 formed between adjacent ones of the plurality of tapered surfaces 44 contact ledge 28 at respective contact points on ledge 28. In contrast, if head 36 consisted of a seamless domed surface, contact between the seamless domed surface and ledge 28 would occur along the entirety of ledge 28. Thus, contact between bit 16 and socket 18 may be minimized by having contact between head 36 and ledge 28 occur at the plurality of seams 48 rather than along a seamless domed surface in contact with the entirety of ledge 28.

According to certain aspects, neck 38 may be grooved such that contact between neck 38 and the plurality of inner walls 24 is minimized and/or avoided when head 36 of bit 16 is inserted into socket 18 and when each of the plurality of contact surfaces 42 engages a respective one of the plurality of inner walls 24. In some aspects, the grooved neck 38 comprises a plurality of concave surfaces 64 extending from respective ones of the plurality of contact surfaces 42. The curvature of the plurality of concave surfaces 62 provides enhanced strength at neck 38, which is useful in situations where bit 16 is used frequently (e.g., in automated hard drive assembly processes in which bits are used to drive sockets at thousands of times per day, resulting in a high wear rate of the bits and a high risk of breakage at the necks of these bits). The curvature of the plurality of concave surfaces 62 prevents having a single fracture point concentrated along neck 38, but rather beneficially disperses any fracture point over a larger region of neck 38 along the curvature. Although FIG. 4A shows a plurality of concave surfaces 62, the grooved neck 38 may also comprise a single surface. For example, the grooved neck 38 may form a hyperboloid or other suitable shapes and configurations known to those of ordinary skill in the art.

In some aspects, bit 16 is made of grade 440C stainless steel. For example, bit 16 may be made of polished grade 440C stainless steel having a Rockwell hardness of HRC 55. Unlike hard chrome steel, which is typically used for bits in driving head stack pivots, grade 440C stainless steel provides a stronger material that may reduce wear on bit 16 and result in the shedding of less particles during contact with socket 18. Therefore, using grade 440C stainless steel may advantageously reduce the number of particles generated as a result of contact between bit 16 and socket 18. However, it will be apparent to those of ordinary skill in the art that bit 16 and/or socket 18 may be made of other materials having similar qualities as grade 440C stainless steel.

According to various aspects of the subject technology, bit 16 is a hex bit and socket 18 is a hex socket. For example, the plurality of inner walls 24 comprises six inner walls, the plurality of contact surfaces 42 comprises six contact surfaces, and the plurality of tapered surfaces 44 comprise six tapered surfaces. However, the plurality of inner walls 24 may comprise more or fewer inner walls depending on the desired application of socket 18. In this regard, the plurality of contact surfaces 42 may comprise more or fewer contact surfaces, and the plurality of tapered surfaces 44 may comprise more or fewer tapered surfaces to correspond with socket 18.

Figure 4B:
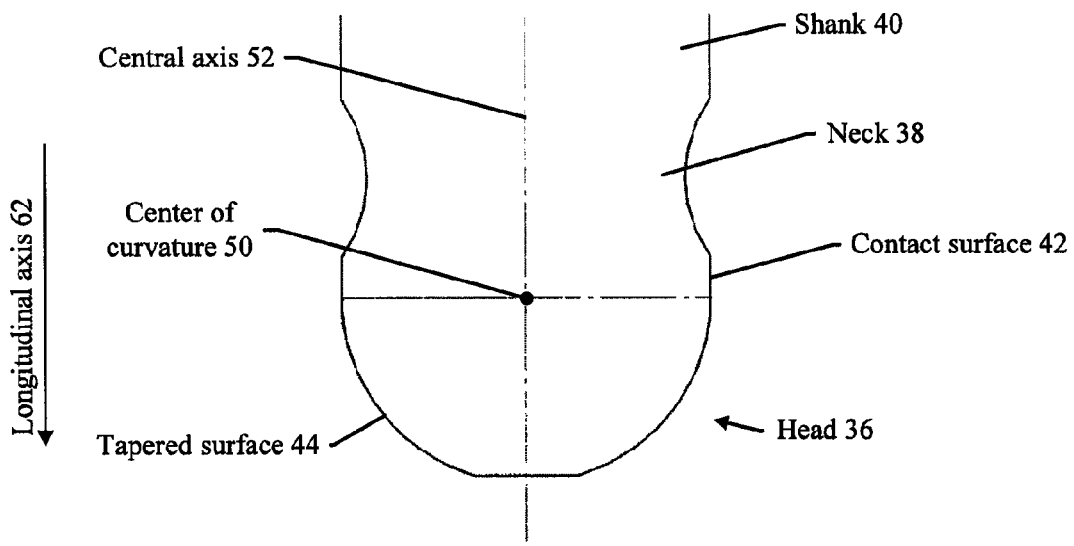
FIG. 4B illustrates a cross sectional view of a bit in accordance with various aspects of the subject technology.

FIG. 4B illustrates a cross sectional view of bit 16 in accordance with various aspects of the subject technology. As shown in FIG. 4B, each of the plurality of contact surfaces 42 is planar for engaging a respective one of the plurality of inner walls 24. In some aspects, center of curvature 50 for each of the plurality of tapered surfaces 44 lies on central axis 52 of bit 16. In particular, center of curvature 50 lies on a single point on central axis 52. By having center of curvature 50 lie on a single point on central axis 52, the plurality of tapered surfaces 44 may form a symmetrical dome-like shape for head 36. The plurality of seams 48 formed between adjacent ones of the plurality of tapered surfaces 44 engage ledge 28 when head 36 is inserted into socket 18, thereby preventing head 36 from being further inserted into socket 18. Although the plurality of tapered surfaces 44 are shown as convex in curvature, the plurality of tapered surfaces 44 may also be planar provided that the plurality of seams 48 are able to engage ledge 28 when head 36 is inserted into socket 18.

Figure 5A:
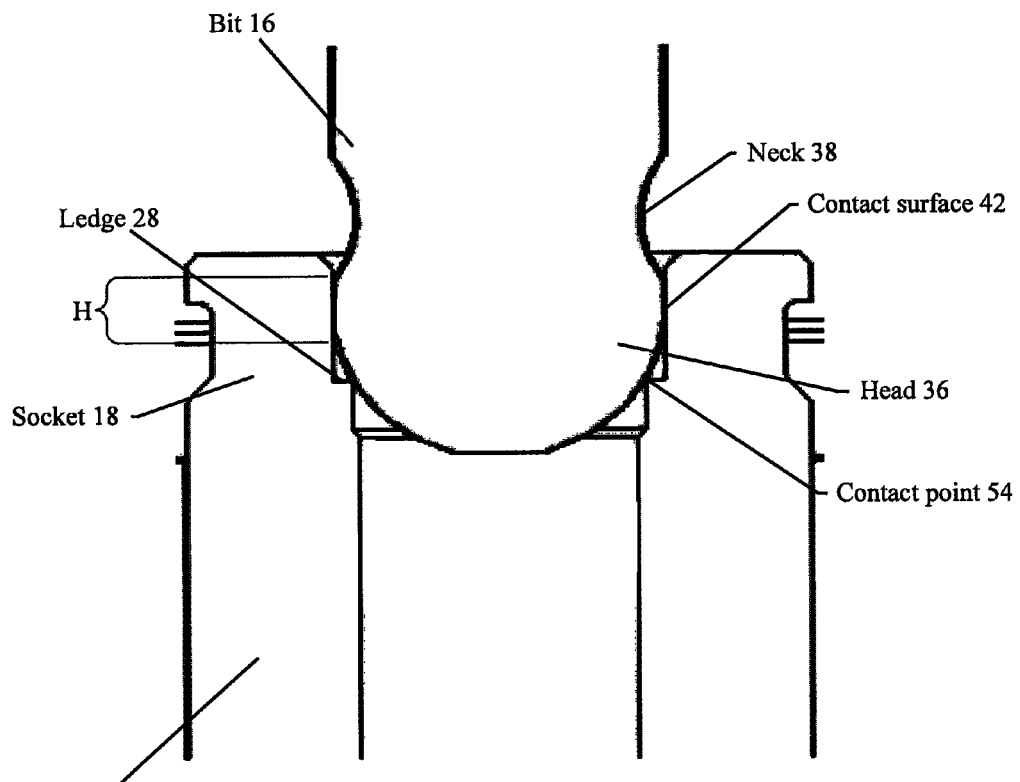
FIG. 5A illustrates a cross sectional view of a bit engaged with a socket in accordance with various aspects of the subject technology.
Figure 5B:
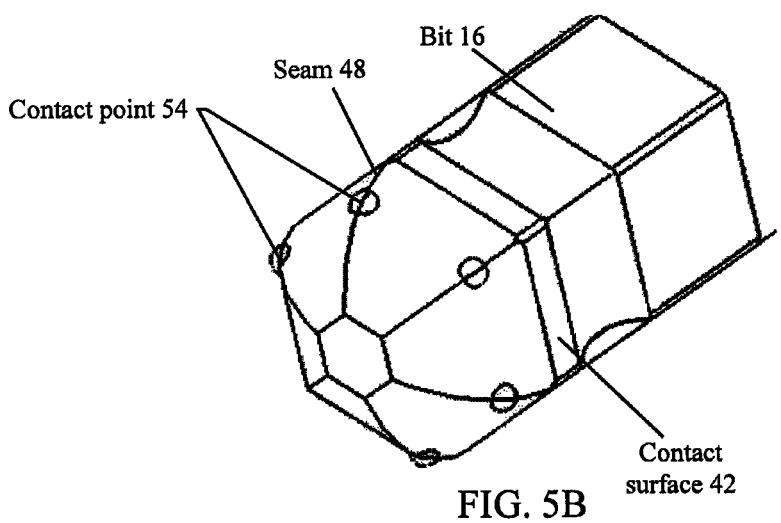
FIG. 5B illustrates a perspective view of a bit having contact points in accordance with various aspects of the subject technology.

FIG. 5A illustrates a cross sectional view of bit 16 engaged with socket 18 in accordance with various aspects of the subject technology. Bit 16 is inserted into socket 18 until head 36 engages ledge 28 for preventing bit 16 from being further inserted into socket 18. Bit 16 is configured to engage ledge 28 at the plurality of seams 48. In some aspects, bit 16 is configured to engage ledge 28 at respective contact points 54 of the plurality of seams 48. FIG. 5B illustrates a perspective view of bit 16 having contact points 54 in accordance with various aspects of the subject technology. The circles in FIG. 5B identify contact points 54 at which the plurality of seams 48 make contact with ledge 28. As noted above, the plurality of seams 48 formed between adjacent ones of the plurality of tapered surfaces 44 contact ledge 28 at respective contact points 54. In contrast, if head 36 consisted of a seamless domed surface, contact between the seamless domed surface and ledge 28 would occur along the entirety of ledge 28. Thus, contact between bit 16 and socket 18 may be minimized by having contact between head 36 and ledge 28 occur at the plurality of seams 48 at respective contact points 54 rather than along a seamless domed surface in contact with the entirety of ledge 28.

Referring back to FIG. 5A, bit 16 is also configured to engage the plurality of inner walls 24 of socket 18 with respective ones of the plurality of contact surfaces 42 when driving the threaded head stack pivot 60 into hard drive base assembly 12. Bit 16 is configured such that head 36 and a portion of the grooved neck 38 are positioned inside of socket 18 when driving the threaded head stack pivot 60 into hard drive base assembly 12. As noted above, neck 38 may be grooved such that contact between neck 38 and the plurality of inner walls 24 is minimized and/or avoided when head 36 of bit 16 is inserted into socket 18 and when each of the plurality of contact surfaces 42 engages a respective one of the plurality of inner walls 24. As shown in FIG. 5A, the portion of the grooved neck 38 adjacent to the plurality of contact surfaces 42 is positioned inside of socket 18, but does not otherwise contact the plurality of inner walls 24. Thus, contact between bit 16 and socket 18 is minimized, beneficially allowing for the reduction of any particles generated as a result of contact between bit 16 and socket 18.

According to various aspects of the subject technology, the average height H (as measured along longitudinal axis 62 of bit 16) of each of the plurality of contact surfaces 42 may be reduced in order to reduce contact between bit 16 and socket 18. For example, the average height H of each of the plurality of contact surfaces 42 may be less than 4.64 millimeters, which may provide a great enough surface area for each of the plurality of contact surfaces 42 to contact a respective one of the plurality of inner walls 24 for driving the threaded head stack pivot 60, and yet, provide a small enough surface area for each of the plurality of contact surfaces 42 to minimize contact with the respective one of the plurality of inner walls 24. In one example, it has been found that the average height H of each of the plurality of contact surfaces 42 may be reduced to as much as 0.43 millimeters. However, it will be apparent to those of ordinary skill in the art that the average height H of each of the plurality of contact surfaces 42 may be higher or lower depending on bit 16's and/or socket 18's size, material, shape, etc., for minimizing contact between bit 16 and socket 18 and yet provide enough contact between bit 16 and socket 18 for bit 16 to drive head stack pivot 60.

In some aspects, the threaded head stack pivot 60 may be driven at a suitable torque using bit 16 while taking into account the reduced contact between bit 16 and socket 18. For example, the threaded head stack pivot 60 may be driven at a torque of about 8 inch-pounds using bit 16. However, it will be apparent to those of ordinary skill in the art that head stack pivot 60 may be driven at a higher or lower torque depending on bit 16's and/or socket 18's size, material, shape, amount of contact, etc.

According to various aspects of the subject technology, a bit 16 and socket 18 pair is provided to minimize contact between them and yet provide enough contact for bit 16 to engage socket 18 for driving the threaded head stack pivot 60. Bit 16 and socket 18 may be designed such that contact occurs between the plurality of inner walls 24 and the plurality of contact surfaces 42, and between ledge 28 and the plurality of contact points 54. It will be apparent to those of skill in the art that modifications to socket 18 may result in corresponding modifications to bit 16. For example, if the plurality of inner walls 24 of socket 18 are reduced in height, the height H of each of the plurality of contact surfaces 42 may also be correspondingly reduced. In some aspects, neck 38 may be grooved at a steeper or more gradual curvature depending on how much contact should be minimized and/or avoided between neck 38 and the plurality of inner walls 24. It will be apparent to those of ordinary skill in the art that different materials, shapes, and sizes may be used for bit 16 and/or socket 18 to ensure that bit 16 may engage socket 18 to achieve the torque needed to drive the threaded head stack pivot 60 and, at the same time, minimize contact between bit 16 and socket 18.

Figure 6:
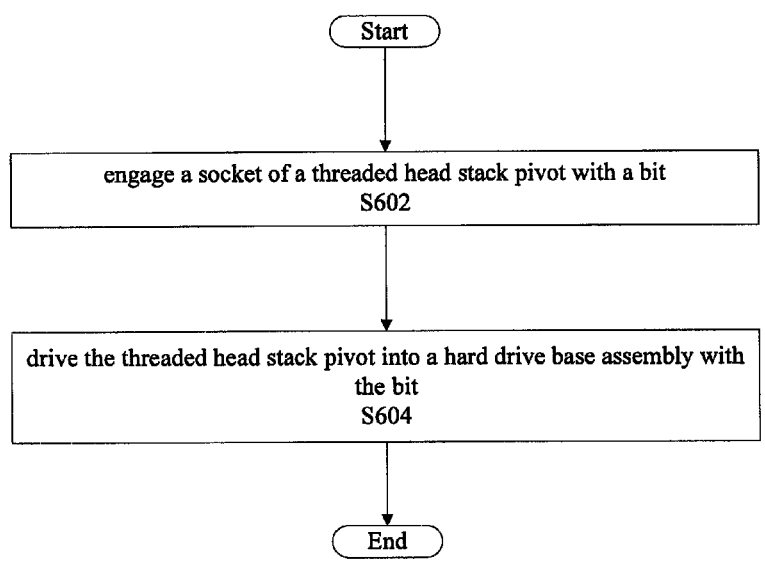
FIG. 6 illustrates a method for fastening a head stack to a hard drive base assembly in accordance with various aspects of the subject technology.

FIG. 6 illustrates method 600 for fastening a head stack to a hard drive base assembly in accordance with various aspects of the subject technology. Method 600 comprises engaging a socket of a threaded head stack pivot with a bit (S602) and driving the threaded head stack pivot into a hard drive base assembly with the bit (S604). The socket comprises a proximal portion defined by a plurality of inner walls arranged parallel to a longitudinal axis of the socket and a distal portion having a width less than a width of the proximal portion and forming a ledge adjacent to the proximal portion. The bit comprises a head comprising a plurality of contact surfaces arranged parallel to a longitudinal axis of the bit and a plurality of tapered surfaces extending from respective ones of the plurality of contact surfaces to a distal end of the bit. The bit engages the ledge of the distal portion of the socket at seams formed between adjacent ones of the plurality of tapered surfaces and engages the plurality of inner walls of the socket with respective ones of the plurality of contact surfaces when the threaded head stack pivot is driven into the hard drive base assembly.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A system for fastening a head stack to a hard drive base assembly, the system comprising:
   a threaded head stack pivot having a socket defined therein, wherein the socket comprises a proximal portion defined by a plurality of inner walls arranged parallel to a longitudinal axis of the socket and a distal portion having a width less than a width of the proximal portion and forming a ledge adjacent to the proximal portion; and
   a bit for driving the threaded head stack pivot into a hard drive base assembly, wherein the bit comprises a head comprising a plurality of contact surfaces arranged parallel to a longitudinal axis of the bit and a plurality of tapered surfaces extending from respective ones of the plurality of contact surfaces to a distal end of the bit, wherein the bit is configured to engage the ledge of the distal portion of the socket at seams formed between adjacent ones of the plurality of tapered surfaces and to engage the plurality of inner walls of the socket with respective ones of the plurality of contact surfaces when driving the threaded head stack pivot into the hard drive base assembly.

2. The system of claim 1, wherein the bit further comprises:
a shank; and
a grooved neck formed in the shank, wherein the head extends from the grooved neck towards the distal end of the bit,
wherein the bit is configured such that the head and a portion of the grooved neck are positioned inside of the socket when driving the threaded head stack pivot into the hard drive base assembly.

3. The system of claim 2, wherein the grooved neck forms a hyperboloid.

4. The system of claim 2, wherein the grooved neck comprises a plurality of concave surfaces extending from respective ones of the plurality of contact surfaces.

5. The system of claim 1, wherein each of the plurality of contact surfaces is planar.

6. The system of claim 1, wherein an average height of each of the plurality of contact surfaces is less than 4.64 millimeters, the average height measured along the longitudinal axis of the bit.

7. The system of claim 1, wherein each of the plurality of tapered surfaces is convex.

8. The system of claim 7, wherein a center of curvature for each of the plurality of tapered surfaces lies on a central axis of the bit.

9. The system of claim 8, wherein the center of curvature for each of the plurality of tapered surfaces lies on a single point on the central axis of the bit.

10. The system of claim 1, wherein the bit is configured to engage the ledge of the distal portion of the socket at respective contact points of the seams formed between adjacent ones of the plurality of tapered surfaces.

11. The system of claim 1, wherein the bit is made of grade 440C stainless steel.

12. The system of claim 11, wherein a Rockwell hardness of the grade 440C stainless steel is HRC 55.

13. The system of claim 1, wherein the plurality of inner walls comprises six inner walls, the plurality of contact surfaces comprises six contact surfaces, and the plurality of tapered surfaces comprises six tapered surfaces.

14. A method for fastening a head stack to a hard drive base assembly, the method comprising:
engaging a socket of a threaded head stack pivot with a bit; and
driving the threaded head stack pivot into a hard drive base assembly with the bit,
wherein the socket comprises a proximal portion defined by a plurality of inner walls arranged parallel to a longitudinal axis of the socket and a distal portion having a width less than a width of the proximal portion and forming a ledge adjacent to the proximal portion,
wherein the bit comprises a head comprising a plurality of contact surfaces arranged parallel to a longitudinal axis of the bit and a plurality of tapered surfaces extending from respective ones of the plurality of contact surfaces to a distal end of the bit, and
wherein the bit engages the ledge of the distal portion of the socket at seams formed between adjacent ones of the plurality of tapered surfaces and engages the plurality of inner walls of the socket with respective ones of the plurality of contact surfaces when the threaded head stack pivot is driven into the hard drive base assembly.

15. The method of claim 14, wherein the threaded head stack pivot is driven at a torque of 8 inch-pounds.

16. A system for fastening a head stack to a hard drive base assembly, the system comprising:
a threaded head stack pivot having a socket defined therein, wherein the socket comprises a proximal portion defined by six inner walls arranged parallel to a longitudinal axis of the socket and a distal portion having a width less than a width of the proximal portion and forming a ledge adjacent to the proximal portion; and
a bit for driving the threaded head stack pivot into a hard drive base assembly, the bit comprising:
a shank;
a grooved neck formed in the shank; and
a head extending from the grooved neck towards a distal end of the bit, the head comprising six planar contact surfaces arranged parallel to a longitudinal axis of the bit and six convex tapered surfaces extending from respective ones of the six planar contact surfaces to the distal end of the bit,
wherein the bit is configured to engage the ledge of the distal portion of the socket at six seams formed between adjacent ones of the six convex tapered surfaces and to engage the six inner walls of the socket with respective ones of the six planar contact surfaces when driving the threaded head stack pivot into the hard drive base assembly, and
wherein the bit is configured such that the head and a portion of the grooved neck are positioned inside of the socket when driving the threaded head stack pivot into the hard drive base assembly.

17. The system of claim 16, wherein the grooved neck forms a hyperboloid.

18. The system of claim 16, wherein the grooved neck comprises six concave surfaces extending from respective ones of the six planar contact surfaces.

19. The system of claim 16, wherein a center of curvature for each of the six convex tapered surfaces lies on a single point on a central axis of the bit.

20. The system of claim 16, wherein the bit is configured to engage the ledge of the distal portion of the socket at respective contact points of the six seams formed between adjacent ones of the six convex tapered surfaces.

21. A system for fastening a head stack to a hard drive base assembly, the system comprising:
a threaded head stack pivot having a socket defined therein, wherein the socket comprises a first portion defined by a plurality of inner walls arranged parallel to a longitudinal axis of the socket and a second portion having a width less than a width of the first portion, further including a stepped portion between the first and second portion that defines a ledge; and
a bit for driving the threaded head stack pivot into a hard drive base assembly, wherein the bit includes a head comprising a plurality of contact surfaces arranged parallel to a longitudinal axis of the bit and a plurality of tapered surfaces extending from respective ones of the plurality of contact surfaces to an end of the bit, the head further including a plurality of seams formed between adjacent ones of the plurality of tapered surfaces, wherein the plurality of seams extend along the longitudinal axis of the bit,
wherein the bit is configured to engage the ledge of the second portion of the socket at the plurality of seams and to engage the plurality of inner walls of the socket with respective ones of the plurality of contact surfaces when driving the threaded head stack pivot into the hard drive base assembly.

22. The system of claim 21, wherein the bit further comprises:
   a shank; and
   a grooved neck formed in the shank, wherein the head extends from the grooved neck towards the end of the bit,
   wherein the bit is configured such that the head and a portion of the grooved neck are positioned inside of the socket when driving the threaded head stack pivot into the hard drive base assembly.

23. The system of claim 22, wherein the grooved neck forms a hyperboloid.

24. The system of claim 22, wherein the grooved neck comprises a plurality of concave surfaces extending from respective ones of the plurality of contact surfaces.

25. The system of claim 21, wherein each of the plurality of tapered surfaces is convex.

26. The system of claim 25, wherein a center of curvature for each of the plurality of tapered surfaces lies on a central axis of the bit.

27. The system of claim 21, wherein the bit is configured to engage the ledge of the second portion of the socket at respective contact points of the seams formed between adjacent ones of the plurality of tapered surfaces.

* * * * *